Figure 1:
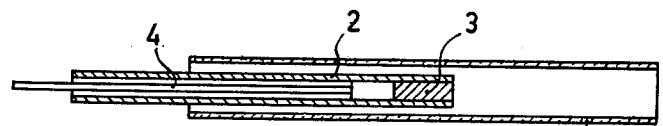

United States Patent [19]
van der Wolf et al.

[11] 3,957,328
[45] May 18, 1976

[54] METHOD OF MANUFACTURING A MERCURY VAPOUR DISCHARGE LAMP

[75] Inventors: Rein Willense van der Wolf; Johannes Antonius Maria Ridders; Cornelis Wilhelmus Adrianus Blommerde, all of Eindhoven, Netherlands

[73] Assignee: U.S. Philips Corporation, New York, N.Y.

[22] Filed: Feb. 14, 1974

[21] Appl. No.: 442,571

[30] Foreign Application Priority Data
Mar. 16, 1973 Netherlands.......................... 733673

[52] U.S. Cl..................................... 316/3; 316/20; 316/24; 316/30
[51] Int. Cl.² ....................................... H01J 9/385
[58] Field of Search ................... 316/3, 4, 5, 12, 16, 316/17, 18, 19, 20, 24, 25, 30; 313/174, 178

[56] References Cited
UNITED STATES PATENTS

| | | | |
|---|---|---|---|
| 537,693 | 4/1895 | Malignani | 316/15 |
| 3,007,071 | 10/1961 | Lompe et al. | 313/178 |
| 3,063,778 | 11/1962 | Audesse | 316/25 |
| 3,152,278 | 10/1964 | Dziergwa et al. | 313/174 |
| 3,510,189 | 5/1970 | Larson et al. | 316/20 |

Primary Examiner—Roy Lake
Assistant Examiner—James W. Davie
Attorney, Agent, or Firm—Frank R. Trifari

[57] ABSTRACT

The invention relates to the manufacture of a discharge vessel with a mercury vapour filling. Mercury is introduced therein by providing mercury amalgam on a small part of the inner wall of an exhaust tube which is connected to the discharge vessel and by releasing the mercury from the amalgam by means of a heat treatment at a suitable moment.

8 Claims, 10 Drawing Figures

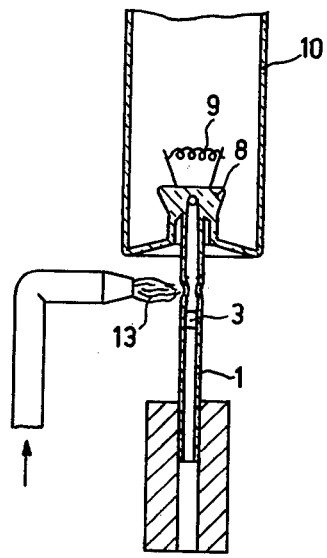
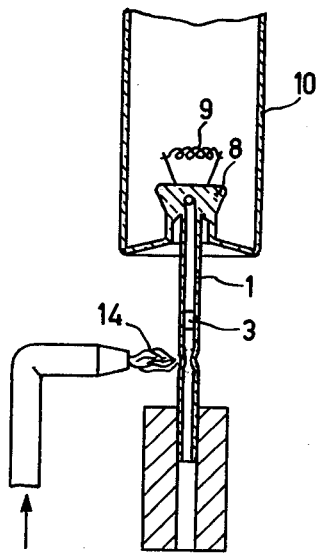
Fig.7  Fig.8
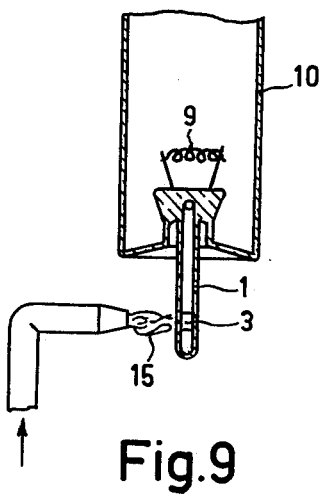
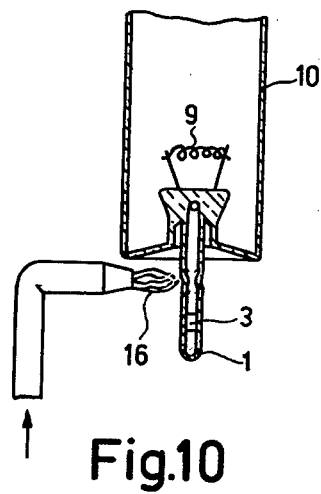
Fig.9  Fig.10

METHOD OF MANUFACTURING A MERCURY VAPOUR DISCHARGE LAMP

The invention relates to a method of manufacturing a mercury vapour discharge lamp and to lamps manufactured by such a method and to parts for comprising such lamps.

In this connection a mercury vapour discharge lamp is to be understood to mean any discharge vessel in which mercury vapour is present, for example, a low-pressure mercury vapour discharge lamp, a high-pressure mercury vapour discharge lamp, a glow discharge lamp with a filling of mercury vapour or of rare gas and mercury vapour etc.

In the manufacture of mercury vapour discharge lamps different methods are used for introducing the required quantity of mercury. It is common practice in low-pressure mercury vapour discharge lamps to introduce a given quantity of mercury into the discharge vessel with the aid of a so-called dosing device. Also solid materials are used which release mercury when they are heated and which are introduced into the lamps in separate holders, so-called mercury dispensers. Furthermore amalgams are used which are provided at one place or another, for example, in an exhaust tube in the discharge vessel and from which mercury is released by heating at a suitable moment.

The invention also relates to a method in which an amalgam is used, but it obviates the drawbacks of the known methods.

When using a mercury dosing device, which is a complicated instrument, more mercury is to be introduced into the discharge vessel than is necessary for the satisfactory operation of the lamp because there is little accuracy of dosing. This gives rise to an excessive use of mercury and ultimately to an unnecessarily large environmental pollution. In fact, at the end of its lifetime the discharge lamp will be destroyed and mercury will be released in the environment; the less mercury the lamp contains the less environmental pollution. A lamp-technical drawback of the use of a dosing device is that failures easily occur, that is to say, no mercury or insufficient mercury is introduced into the discharge lamp.

The above-described drawbacks are found to a lesser extent when using a mercury amalgam, for example, consisting of indium plus mercury because the quantity of mercury can easily be dosed. The use of a mercury amalgam according to the known methods has, however, the drawback that the so-called carrier of the amalgam, for example, indium is left in the discharge vessel. During operation of the lamp the mercury vapour pressure is determined by the carrier materials and its temperature. Associated with each amalgam, no matter its composition, is a given mercury vapour pressure which is a function of the temperature. The result of all this is that the choice of the composition of the amalgam to be used is very limited and that the operation of the lamp is influenced by temperature fluctuations. This may lead, for example, in low-pressure mercury vapour discharge lamps to considerable variations in the quantity of emitted radiation.

According to the invention a method of manufacturing a mercury vapour discharge lamp from an envelope provided with an exhaust tube is characterized in that a thin coating of amalgam is present on the inner wall of the exhaust tube from which coating mercury is released by heating of the amalgam after exhausting the lamp, while subsequently the exhaust tube is sealed between the envelope and the place where the amalgam was present.

If the exhaust tube is made glass, sealing will be effected by heating and optionally pinching. For other materials it is possible, for example, to pinch, weld, melt, solder etc.

Likewise as in the above-described known amalgam method the advantage of a method according to the invention is that accurate dosing of mercury is possible, but this invention does not have the drawback that the carrier of the amalgam, for example, indium is left in the discharge vessel. In fact, the exhaust tube is sealed after, the mercury has been driven out of the amalgam in the actual discharge vessel. Together with the part of the exhaust tube which may be tipped off from the lamp upon, sealing, the carrier of the amalgam is also removed.

Where reference is made to "exhausting" of the lamp this is understood to mean the filling with a desired gas atmosphere (except for mercury), operating and degassing of electrodes, degassing the wall and other lamp components in the discharge space etc.

The method according to the invention can be used for discharge lamps of varying shapes provided that they have an exhaust tube. This is the case in most discharge lamps. The exhaust tube may be present in alignment with the actual discharge vessel, on its side or elsewhere. In a discharge vessel of very small dimensions such as, for example, glow discharge lamps the exhaust tube may have the same cross-section as the actual discharge space. Discharge space and exhaust tube then jointly constitute, as it were, a continuous tube.

The method according to the invention is extremely simple and does not require complicated equipment such as, for example, mercury dosing devices. Neither are any separate components and special assembly machines necessary for this purpose as is the case when using mercury dispensers. The only precaution to be taken is that the amalgam is present at such an area and/or at such a temperature in the exhaust tube that substantially no mercury is released from the amalgam during all treatments proceding the heat treatment of the amalgam.

The heat treatment may be effected with a small gas flame, an electric filament or, for example, by directing a concentrated beam of light onto the amalgam in the exhaust tube.

During the release of mercury from the amalgam the exhaust tube may still be connected to an exhauster or a space in which gas is present, but the mercury may alternatively be released after the exhaust tube is sealed at an area which is farther away from the envelope than the amalgam. The mercury may then be released at a later suitable moment whereafter the exhaust tube is tipped off between the envelope and the place where the amalgam was present. This process has the advantage for bulk manufacture that mercury cannot penetrate the exhauster. In addition the spread in the quantity of mercury in various lamps of a series is smaller.

When the amalgam is to be placed very closely to the envelope, for example, to make a very short exhaust tube it may be desirable to cool the amalgam during the entire period (or part thereof) preceding the release of mercury, for example, by means of a stream of air, nitrogen, or another gas.

It is not necessary that the amalgam is provided in the exhaust tube after this tube has been connected to the envelope. In many cases it is even recommendable to do this before the connection is established. In that case a special method may be used as will be described hereinafter to provide the amalgam in the exhaust tube. A method which is, as it were, halfway between the two methods is the one in which the amalgam is introduced into the exhaust tube after the exhaust tube has been connected to a so-called stem. Such a stem which is connected to the envelope of the discharge lamp at a later stage supports, for example, electrodes, auxiliary electrodes, supporting wires or such elements. The use of such stems is, for example, very common practice in the manufacture of low-pressure mercury vapour discharge lamps.

In all methods of providing the amalgam in the exhaust tube, but particularly when separate exhaust tubes or stems with exhaust tubes are to be provided with amalgam in separate operations the amalgam can be introduced into the exhaust tube in a more or less liquid form and be spread to a thin wall coating by means of rotating of the exhaust tube. An amalgam which is particularly suitable for this purpose consists of a combination of mercury and indium in which the ratio between mercury and indium expressed in grammes is 3 : 1. The amalgam may be introduced into the exhaust tube, for example, with the aid of a hollow needle of a simple shape.

If the amalgam is not sufficiently spread on the desired part of the wall of the exhaust tube during rotation this drawback can be mitigated by directing a fine gas jet, for example, air, nitrogen or argon onto the amalgam while rotating the exhaust tube.

As already stated above it may be advantageous to provide separate exhaust tubes or stems with exhaust tubes with amalgam. Such separate exhaust tubes or stems may be marketed as a product. The invention therefore also relates to such separate exhaust tubes and/or stems.

The invention will now be described with reference to a drawing.

In FIGS. 1–10 of the drawing the manufacture of a low-pressure mercury vapour discharge lamp, an exhaust tube and a stem therefor is diagrammatically shown on a reduced scale by way of example.

Figure 2:
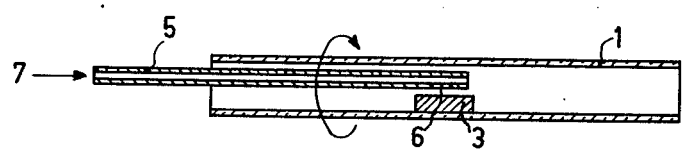
Figure 3:
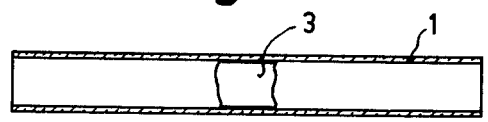
Figure 4:
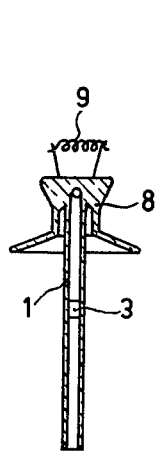

In FIG. 1 the reference 1 denotes a glass exhaust tube which must be provided with a coating of indium mercury amalgam in a separate operation. To this end a little tube 2 containing a quantity of amalgam paste 3 is introduced into the tube 1. This amalgam is pressed out of the little tube 3 with the aid of the plunger 4 so that it comes in the exhaust tube as is shown in FIG. 2. By quick rotation of the exhaust tube 1 the amalgam 3 spreads in a strip on the wall of the tube, optionally with the aid of a stream of air which is blown into the tube 5 at 7 and which blows against the amalgam 3 through the hole 6. The result of these operations is shown in FIG. 3. The amalgam 3 is now spread in a strip on the entire circumference of the exhaust tube 1. FIG. 4 shows a stem 8 with an electrode 9 and the exhaust tube 1 of FIG. 3 secured thereto. During this securement the temperature of the amalgam 3 may be maintained so low that the mercury is not released from the amalgam. If necessary the amalgam may be cooled, for example, by a gas stream.

Figure 5:
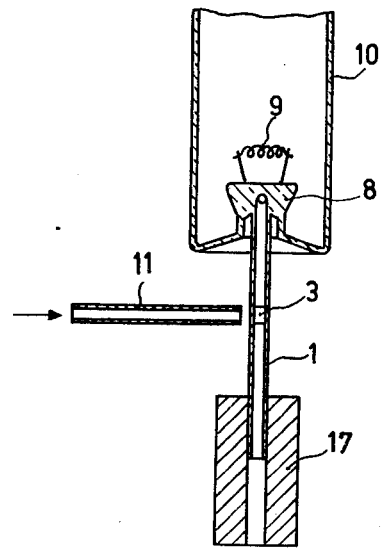
Figure 6:
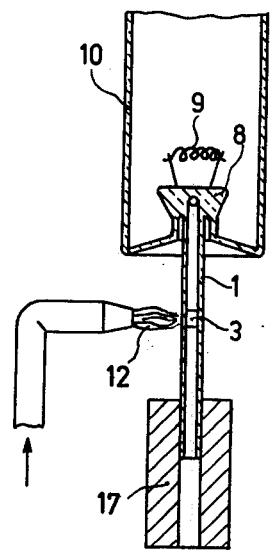

FIG. 5 shows part of a lamp with the envelope 10 and the stem 8 of FIG. 4. The exhaust tube 1 is connected through a hose 17 to an exhaust installation (not shown). Gases can be removed from and introduced into the lamp 10 with this exhaust installation as is common practice for the methods for lamp manufacture. Since the lamps must be heated, for example, in a furnace during exhausting, the distance between the envelope 10 and the amalgam 3 must be so large that the temperature of the amalgam remains so low that no mercury is released therefrom, or the amalgam must be cooled, for example, by a gas stream which is blown against the exhaust tube through the tube 11 at the area of the amalgam 3. After exhausting the amalgam 3 is heated with the aid of a gas flame 12 as is shown in FIG. 6. During this heat treatment exhausting no longer takes place. The mercury released in vapour form from the amalgam is mainly passed on to the envelope 10. Subsequently, as shown in FIG. 7, the exhaust tube 1 is tipped off with the aid of a pointed gas flame 13 between the envelope 10 and the area 3 where then only the carrier material, for example, indium of the amalgam is present.

FIG. 8 shows a manufacturing stage which may follow that of FIG. 5. In FIG. 8 the reference numeral 14 denotes a gas flame with which the exhaust tube 1 is sealed at an area which is farther away from the envelope than the amalgam 3. The amalgam 3 in the product thus obtained is heated during a subsequent stage as shown in FIG. 9 with the aid of a gas flame 15. Subsequently as shown in FIG. 10, the exhaust tube 1 is tipped off with the aid of a pointed flame 16 between the envelope 10 and the area 3 where the amalgam was present.

We claim:

1. A method of manufacturing a mercury vapour discharge lamp from an envelope provided with an exhaust tube which comprises depositing a quantity of amalgam paste, which releases mercury when heated, at one axial portion of said exhaust tube, said depositing being accomplished with a second tube having an external diameter smaller than the internal diameter of the exhaust tube and a plunger disposed in said second tube, said second tube carrying a quantity of amalgam paste within the interior thereof at one end, said second tube being positioned in the exhaust tube and said plunger being axially positioned to displace a quantity of amalgam paste, spreading said paste about the interior surface of said tube mechanically to form a thin coating of amalgam on an axial portion of the inner wall of the exhaust tube; exhausting of the lamp, releasing mercury by heating the amalgam and sealing the exhaust tube between the envelope and the area where the amalgam was present.

2. A method as claimed in claim 1, wherein before said releasing step a step is included of sealing the exhaust tube at an axial portion which is farther away from the envelope than the amalgam.

3. A method as claimed in claim 2, wherein the amalgam is disposed axially in the exhaust tube at an axially spaced location so that substantially no mercury is released from the amalgam prior to said releasing step.

4. A method as claimed in claim 2 further including the step of cooling said amalgam during all steps prior to said heating step.

5. A method as claimed in claim 4, wherein the exhaust tube is secured to the envelope after said applying step.

6. A method as claimed in claim 5, wherein said exhaust tube forms part of a stem formed in separate 7. A method as claimed in claim 1, wherein said amalgam paste has a low viscosity and said spreading step comprises rotating the exhaust tube.

8. A method as claimed in claim 7, wherein during rotation of the exhaust tube a fine gas jet is directed onto said amalgam.

* * * * *

UNITED STATES PATENT AND TRADEMARK OFFICE
CERTIFICATE OF CORRECTION

PATENT NO. : 3,957,328
DATED : May 18, 1976
INVENTOR(S) : Rein Willemse Van Der Wolf et al.

It is certified that error appears in the above-identified patent and that said Letters Patent are hereby corrected as shown below:

Section 30 (Title Page)

"733673" should be --7303673--

Signed and Sealed this

Fourth Day of January 1977

[SEAL]

Attest:

RUTH C. MASON
*Attesting Officer*

C. MARSHALL DANN
*Commissioner of Patents and Trademarks*